United States Patent [19]
Hisatome

[11] Patent Number: 5,265,410
[45] Date of Patent: Nov. 30, 1993

[54] POWER GENERATION SYSTEM

[75] Inventor: Masatoshi Hisatome, Tokyo, Japan

[73] Assignee: Mitsubishi Jukogyo Kabushiki Kaisha, Tokyo, Japan

[21] Appl. No.: 677,334

[22] Filed: Mar. 29, 1991

[30] Foreign Application Priority Data

Apr. 18, 1990 [JP] Japan ................ 2-100417

[51] Int. Cl.$^5$ ............................. F02B 43/00
[52] U.S. Cl. .................................. 60/39.12
[58] Field of Search ................... 60/39.12, 39.05

[56] References Cited

U.S. PATENT DOCUMENTS

| | | | |
|---|---|---|---|
| 2,706,150 | 4/1955 | Lloyd | 60/39.12 |
| 2,714,670 | 8/1955 | Linder et al. | 60/39.12 |
| 3,101,592 | 8/1963 | Robertson et al. | 60/39.05 |
| 3,359,723 | 12/1967 | Bohensky et al. | 60/39.05 |
| 3,657,879 | 4/1972 | Ewbank et al. | 60/39.05 |
| 4,212,160 | 7/1980 | Blaskowski | 60/39.12 |
| 4,250,704 | 2/1981 | Bruckner et al. | 60/39.12 |
| 4,489,562 | 12/1984 | Snyder et al. | 60/667 |
| 4,499,721 | 2/1985 | Cheng | 60/39.05 |
| 4,569,194 | 2/1986 | Giles et al. | 60/39.12 |
| 4,667,467 | 5/1987 | Archer et al. | 60/39.12 |
| 4,677,829 | 7/1987 | Archer et al. | 60/39.12 |
| 4,785,622 | 11/1988 | Plumley et al. | 60/39.12 |
| 4,884,396 | 12/1989 | Miyamoto et al. | 60/39.12 |
| 5,079,909 | 1/1992 | Bruckner et al. | 60/39.12 |

FOREIGN PATENT DOCUMENTS

| | | |
|---|---|---|
| 0184137 | 6/1986 | European Pat. Off. . |
| 1104075 | 2/1968 | United Kingdom . |
| 1298434 | 12/1972 | United Kingdom . |
| 2191215A | 12/1987 | United Kingdom . |

Primary Examiner—Richard A. Bertsch
Assistant Examiner—Michael I. Kocharov
Attorney, Agent, or Firm—Jacobson, Price, Holman & Stern

[57] ABSTRACT

A coal gasification composite power generation system including a primary combustor (2) for effecting high temperature combustion of coal fuel (8) under a reducing condition by compressed air or oxygen supplied from a compressor (1), a secondary combustor (3) for effecting complete combustion of the resulting product gas of the primary combustor, the secondary combustor (3) being supplied with the primary combustor product gas, air or oxygen for complete burning of the primary combustor product gas and an additive gas for controlling the combustion gas temperature in the secondary combustor consisting either of steam or carbon dioxide, a gas turbine (4) for driving the compressor (1) and driven by a working fluid consisting of the resulting combustion gas from the secondary combustor. Disposed in series downstream of the gas turbine are a waste heat system generator (5, 18) a desulfurizer (6) and a condenser (7) for separating $CO_2$ and $H_2O$ from the exhaust gas of the gas turbine (4). Either $CO_2$ or $H_2O$, converted to steam in the steam generator (5), is fed to the secondary combustor for controlling the temperature of the combustion gas therein.

12 Claims, 7 Drawing Sheets

FIG. I

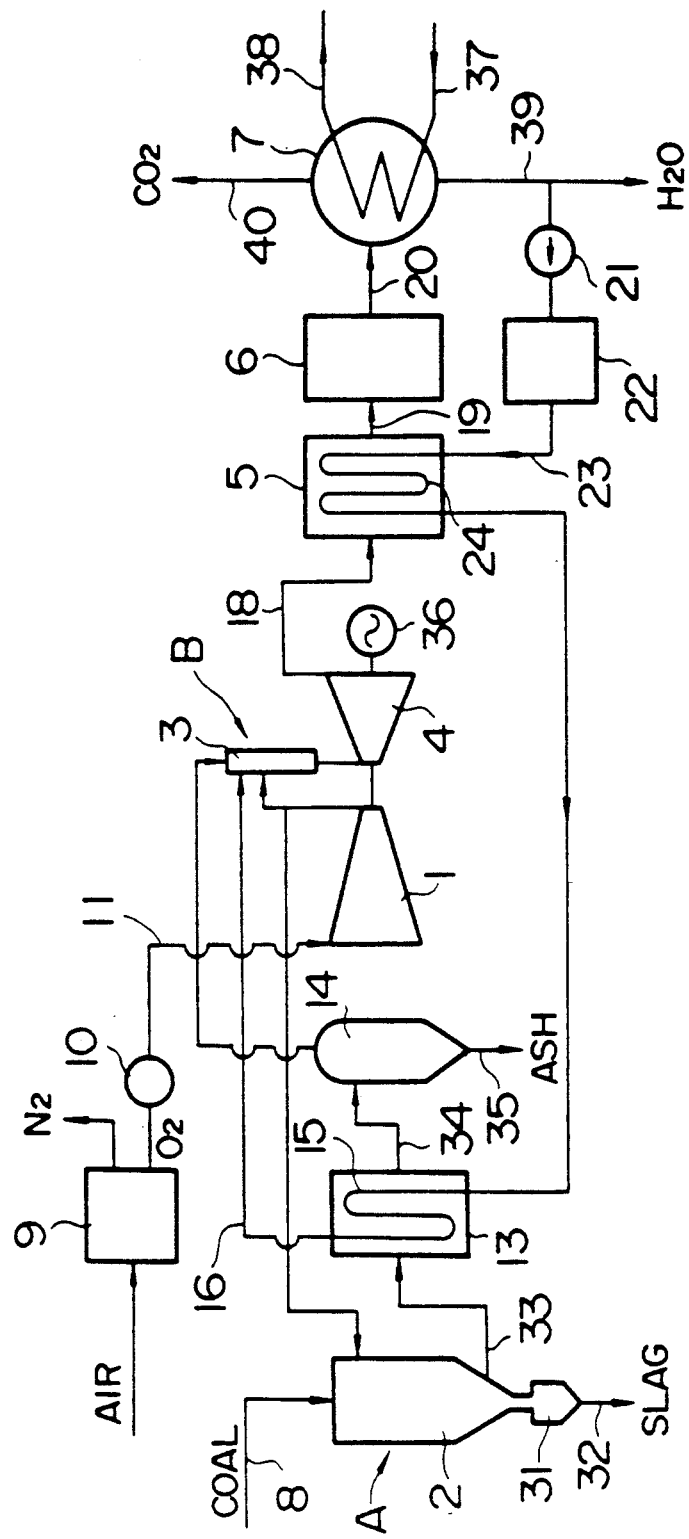
F I G. 5

POWER GENERATION SYSTEM

BACKGROUND OF THE INVENTION

The present invention relates to a power generation system.

For a better understanding of the invention, an explanation is first made for a typical coal gasification composite power generation system of the prior art with reference to FIG. 7.

The gasifier unit is composed essentially of a primary combustor 01 and a succeedingly disposed reductor 07. The primary combustor 01 is supplied with coal and char as the fuel. The term "char" is intended to mean a pulverous carbon deposited in the gasifier unit without being availed for the gasification. The primary combustor 01 is operated under a high temperature combustion of such supplied fuel under a reducing condition (an air ratio of less than 1) with compressed air. Coal is supplied to the primary combustor 01 from a coal supply duct 02. Char is recovered after the gasifier unit by a char collector 03 and returned to the primary combustor 01 via a char supply duct 04 as fuel supplement. A turbo compressor 05 is employed for supplying the compressed air to the combustor via an air duct 06. The combustion gas enters the reductor 07, where the intrinsic gasification of the coal fuel additionally supplied thereto from the supply duct 02 is realized according to the following reaction scheme:

$$C + H_2O \rightarrow CO + H_2$$

The resulting product gas is cooled through a heat economizer 08 and is then passed to the char collector 03 via a gas duct 09 to recover the deposited char. The collected char is returned to the primary combustor 01 via the char supply duct 04 as explained previously.

The product gas leaving the char collector 03 enters then a dry desulfurizer 011 via a gas duct 010, where it is desulfurized. The desulfurized gas passes then through a dust remover 013 via a gas duct 012 to remove the entrained dust particles, before it is fed to a secondary combustor 015 constituting the burner for a gas turbine 016 via a gas duct 014, where it is burned completely by compressed air supplied from the turbo compressor 05. The resulting combustion gas drives the gas turbine 016 for generating electric power by a generator 029 driven by the gas turbine. The gas turbine inlet temperature is controlled by adjusting the feed rate of the combustion air or, if the air feed rate is set at a constant value, by adjusting the feed rate of coal to the gasifier unit.

The turbine exhaust gas is sent to a waste heat steam generator 018, where the sensible heat of the turbine exhaust gas is recovered by utilizing it for steam generation before it is discharged out to the atmosphere via a chimney 019.

The steam produced in the steam generator 018 is supplied via a steam main 020 to a steam turbine 021 for an additional power generation. The spent steam is condensed in a condenser 022 and the condensate is returned to the steam generator 018 and to the heat economizer 08 via each water feed line 024, 025 by a feed pump 023 under pressure elevation. The steam generated in the heat economizer 08 is also supplied to the steam main 020 via a steam line 026 and is used for the power generation in the steam turbine 021. On combustion of the coal fuel in the gasification unit, molten slag or ash in a form of particles is formed, which fall down into a slag tank 026 and are discharged to the outside of the system through a discharge duct 027. The dust collected in the dust remover 013 is taken out of the system via a discharge duct 028.

By the gas turbine 016, the generator 029 is driven to generate electric power.

Coal gasification composite power generation systems of the prior art as explained above have exhibited many problems left unsolved, such as the following:

A) Problems in the Heat Cycle

The coal gasification is realized, as explained above, in the gasification unit composed of a primary combuster for producing a high temperature gas and of a reductor for gasifying the coal supplied thereto, in which the gasification is effected at a reaction temperature maintained at about 1,000° C. Here, some time intervals are required for achieving sufficient mixing of the coal powder with the reaction gas and also for the gasification reaction to take place up to a sufficient degree, so that the gasification unit has to be designed on a large scale. In addition, the wall of the gasification unit should be constructed as a water-wall similar to that of a boiler furnace to provide sufficient cooling for protecting against the high temperature inside the unit.

For practical operation of dust removal and of desulfurization, the primary combustor product gas has to be cooled down to a low temperature, for example, to ordinary temperature, so that a waste heat recovery means, such as the heat economizer 08, or the like, should be installed at the outlet of the gasification unit, in order to recover the sensible heat of the product gas deprived upon the cooling thereof by generating steam for driving a steam turbine power generator.

Thus, the coal gasification product gas which has been subjected to heat recovery by a Rankine cycle is employed for the fuel of the gas turbine. In the above typical prior art system, the coal gasification product gas which has passed through the heat economizer 08 is supplied to the burner 015 to produce gas for driving the gas turbine 016. The exhaust gas of the gas turbine 016 is then once more subjected to a heat recovery by waste heat steam generator 018 for driving the steam turbine 021. Thus, the prior art system operates, from the point of view of its heat cycle, in a sequence of a steam cycle/gas turbine cycle/steam cycle, namely a Rankine cycle in the gasification unit)/a Brayton cycle (in the gas turbine)/a Rankine cycle in the waste heat steam generator), that is to say, a system in which a steam turbine cycle is installed upstream of the gas turbine cycle.

Therefore, the prior art system suffers from a lower over-all heat efficiency on the theoretical basis, as compared to a supposed system of a simple combination of a gas turbine cycle with a steam turbine cycle, since an additional steam cycle (with a relatively low theoretical heat efficiency) is added preceding the supposed simple composite cycle of a direct series combination of a gas turbine cycle (with a relatively high theoretical heat efficiency) with a steam cycle. An explanation of this with an exemplary calculation will now be given.

Assuming that the proportion of heat recovered in the gasification unit relative to the total enthalpy of the product gas is, for example, 40% and the gas having an enthalpy of the remaining 60% is supplied to the gas turbine operated with an over-all heat engine efficiency of, for example, 32% and the over-all heat efficiency in the steam cycle of the gasification unit is about 40% and that of the waste heat steam generator is about 20%, the over-all heat efficiency $\eta_1$ of the coal gasification composite power generation system of the prior art is calculated by:

$$\eta_1 = 0.4 \times 0.40 + 0.6 + 0.32 + (0.6 - 0.19) \times 0.20$$
$$= 0.434$$
$$= 43.4\%$$

In contrast thereto, the over-all heat efficiency $\eta_2$ for a supposed simple composite cycle is calculated as:

$$\eta_2 = 1.0 \times 0.32 + (1.0 - 0.32) \times 0.2 = 0.456$$
$$= 45.6\%$$

Comparing the two calculations, it is seen that the over-all heat efficency of the supposed simple composite cycle is higher than that of the coal gasification composite power generation system by a relative proportion of about 5%.

Thus, it is recognized that an incorporation of a steam cycle preceding the combination of a gas turbine cycle with a steam turbine cycle causes a theoretical decrease in the over-all heat efficiency of the system.

B) Problem in the Complexity of the System

The gasification unit operates at a high temperature of about 1,000° C. This high temperature brings about an inevitable large-sized design of the unit, in order to attain substantial completion of the conversion and, in addition, the deposition of carbon, i.e. char, as described above. The deposited char should be returned to the gasification unit, necessitating means (such as 03 and 04) for collecting and returning the char. A heat recovering means, such as the heat economizer 08, is also necessary for cooling the product gas from the gasification unit once to a low temperature, such as ordinary temperature. The necessity of such accessory installations brings about complexity of the system, in addition to the problem of the unavoidable large scale layout of the gasification unit, resulting in a large investment cost.

C) Problems incidental to $CO_2$ Removal

As to the removal of $CO_2$ from the waste gas for environmental protection, it is important, taking into account the provisional or legal limitation of the total amount of $CO_2$ permitted to be wasted into the atmosphere expected in the near future, to provide for such removal or separation of $CO_2$ at the lowest investment cost with minimum power consumption. In this respect, the previous coal gasification composite power generation systems have revealed the following problems.

(1) An additional installation of an apparatus for removing or recovering $CO_2$, such as, an adsorption column based on PSA or TSA, a low temperature cryoseparator and so on, is necessary.

(2) An installation of a CO-shift converter for complete conversion of CO in the product gas from the coal gasification unit into $CO_2$. A CO-shift converter for realizing the reaction $$CO + H_2O \rightarrow CO_2 + H_2$$

employs a conversion catalyst, which is subject to a deterioration of the catalytic activity after a certain operation period, requiring a frequent renewal of the spent catalyst.

(3) A large power consumption is required for the $CO_2$ separation in the prior system due to additional installation of a separate apparatus, such as, PSA, TSA or cryoseparator, therefor. These separation apparatuses each require a comparable energy consumption for separating $CO_2$. Thus, an energy consumption of about 0.4 kWh (about 430 kcal) is necessary to separate 1 NTP m³ of $CO_2$. This value corresponds to about 10% of the power generated by the system, which corresponds to about 20% of the heat energy, bringing about a considerable energy cost for the $CO_2$ separation.

The world-wide status of the technique today for the coal gasification composite power generation system proposed by various plant makers of the world is as explained above and, thus, there are many problems left still unsolved.

BRIEF SUMMARY OF THE INVENTION

The object of the present invention is to provide a power generation system which is constructed to obviate the problems concerning the heat cycle, the complicated arrangement of the system and the technique for $CO_2$-separation in the known technique explained above.

The above object is solved by providing a power generation system according to the present invention, which comprises a primary combustor for effecting a high temperature combustion of coal fuel under a reducing condition by compressed air or oxygen supplied from a compressor; a secondary combustor for effecting complete combustion of the resulting product gas of the primary combustor, the secondary combustor being supplied with the primary combustor product gas, air or oxygen for effective complete combustion of the primary combustor product gas and an additive gas for effecting control of the combustion gas temperature in the secondary combustor consisting either of steam or of carbon dioxide; a gas turbine driven by a working fluid consisting of the secondary combustor combustion gas and; disposed in series downstream of the gas turbine a waste heat steam generator, a desulfurizer and a condenser for the exhaust gas of the gas turbine in that order.

The primary combustor of the system according to the present invention serves for combustion of coal fuel under a reducing condition by the lowest necessary amount of compressed air or oxygen for effecting the combustion of the coal fuel at a temperature high enough to cause melting of ash from the combustion. This will bring about a high calorific value of the resulting product gas, a low rate of unburned loss (below 1%) of the fuel, a high separation rate (over 80-90% or more) of the molten ash and an easy cleanup treatment of the product gas.

An employment of the lowest requisite amount of the oxygen-containing gas for the incomplete combustion in the primary combustor permits forming a product gas from primary combustor having high calorific value to be supplied to the secondary combustor. Moreover, an installation of a steam cycle upstream of the gas turbine is dispensed with. Therefore, it is possible to obtain a maximum amount of the combustion gas in the secondary combustor maintained at a scheduled gas temperature at the inlet of the gas turbine (the highest permissible temperature for the gas turbine) by controlling the amount of the oxygen-containing gas supplied to the secondary combustor. This is to say, that the maximum amount of combustion gas having the highest permissible temperature and having a calorific value corresponding to 100% of the total enthalpy of the product gas supplied can be fed to the gas turbine, so long as the indispensable energy loss, such as, the heat dissipated into the environment etc., is neglected. Thus, it is possible to construct a coal gasification composite gas turbine power generation system of maximum efficiency.

Moreover, an installation of the char recovery and recirculation means required in the prior art system can be dispensed with, since the composite power generation system according to the present invention does not form any char.

It is possible to design the heat exchanger for cooling the primary combustor product gas in smaller dimensions since it is sufficient to cool the product gas from the primary combuster only to a temperature lower than the melting point of the ash formed therein.

In the case of oxygen-burning (use of oxygen as the burning gas in the primary and secondary combustors of the system), the exhaust gas from the gas turbine is composed of only $CO_2$ and $H_2O$ (exactly speaking, scarce amounts of Ar and $N_2$ are included), so that $CO_2$ (having a small moisture content) can be separated from the steam content by simply cooling the exhaust gas of the gas turbine in a turbine exhaust gas condenser to cause condensation of steam into liquid phase water separated from the gas phase of $CO_2$. Thus, employment of an installation of special means for separating $CO_2$ is unnecessary, with simultaneous omission of power consumption therefor.

In the air-burning (use of air as the burning gas in the primary and secondary combustors), the gas turbine exhaust gas is composed mainly of $N_2$, $CO_2$ and steam (in the case of employment of water recirculation in the system explained below) or of $N_2$ and $CO_2$ (in the case of $CO_2$ recirculation in the system explained also below). Thus, the dry gas which has passed the exhaust gas condenser contains $N_2$ beside the content of $CO_2$. However, the amount of dry gas is small due to the separation of the steam content, and it is practically easy to realize separation of $CO_2$ from $N_2$.

As described above, the system according to the present invention provides various advantageous effects as follows:

1) Each element for the gasification unit inclusive of the primary combustor can be designed in smaller size and the heat for cooling the primary combustor product gas is small, since the coal fuel for operating the system is supplied altogether to the primary combustor and the coal fuel is subjected to an incomplete burning at high temperature using the minimum requisite amount of compressed air or oxygen. The greater part of ash formed in the gas produced in the primary combustor is removed within the gasification unit and the remainder part is removed in a subsequently disposed dust remover to a level permissible for the gas turbine. It is thus sufficient to cool the product gas of the primary combustor only to a level below the melting point of the ash (usually above 800° C.) for carrying out the dry dust removal, allowing design of the heat exchanger for the product gas of the primary combustor in a small size with smaller heat required for cooling thereof. Therefore, the primary combustor and the heat exchanger for the product gas thereof may be designed in an air-cooled or oxygen-cooled construction, instead of a water-cooled construction. The resulting heated air or oxygen is utilized for burning the coal fuel and for burning the product gas in the primary and secondary combustors.

In this mannar, an improvement in the heat efficiency can be attained, since a steam cycle having a relatively low theoretical heat efficiency installed in a conventional coal gasification composite power generation system upstream of the gas turbine can be omitted.

2) When the cooling of the primary combustor product gas is effected by heat exchange of the product gas with the oxygen-containing gas to be supplied to the primary combustor or using the steam generated in the waste heat steam generator, an employment of a steam cycle, which has lower theoretical heat efficiency, upstream of the gas turbine can be omitted and, thus, an improvement in the heat efficiency is realized.

3) Due to the omission of the separate gasification part (reductor) in the gasification unit of the conventional system permitted by the employment of an integral gasification unit with total supply of the coal fuel altogether to the primary combustor and due to elimination of any char formation, a simplification of the gasification unit due to omission of the reductor with its accessory members and of installations for the collection and recirculation of char can be attained.

4) In the case of oxygen-burning, the combustion gas in the secondary combustor consists substantially of $CO_2$ and $H_2O$, so that $CO_2$ can be separated from the combustion gas by simply cooling and condensing the steam component as condensate in a condenser for the turbine exhaust gas, with elimination of any requirement of power consumption for the $CO_2$ separation.

5) In the case of air-burning, the combustion gas in the secondary combustor consists essentially of $N_2$, $CO_2$ and $H_2O$ with some minute gas components. Here, it is not possible to attain separation of $CO_2$ simply by condensing the $H_2O$ content therein. However, the total amount of the combustion gas in the secondary combustor is relatively small (the air ratio requisite in the composite power generation system according to the present invention amounts only to about 1.1 as contrasted to that of about 3 in the conventional composite power generation system, producing thus only about ⅓ of the combustion gas as compared with the conventional composite power generation system) and the temperature thereof is maintained relatively low, so that the separation of $CO_2$ is much easier than in the conventional composite power generation system.

BRIEF DESCRIPTION OF THE DRAWINGS

The invention will now be described in greater detail with reference to the accompanying drawings wherein:

FIG. 5 is a schematic flow diagram showing another embodiment of the coal gasification composite power generation system employing oxygen-burning with water recirculation according to the present invention;

DETAILED DESCRIPTION OF PREFERRED EMBODIMENTS

Figure 1:
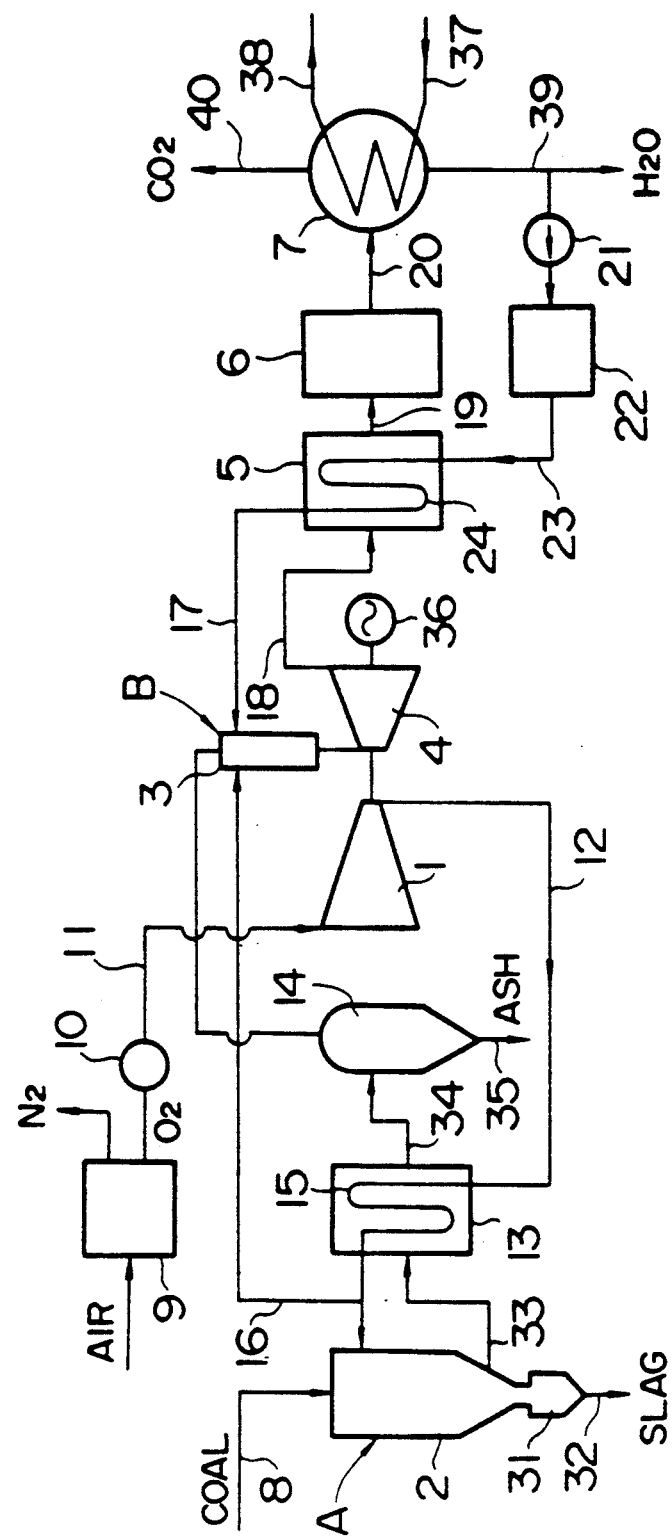
FIG. 1 is a schematic flow diagram showing an embodiment of the coal gasification composite power generation system employing oxygen-burning with water recirculation according to the present invention.

The present invention will be described below with respect to six embodiments thereof each shown in a corresponding figure in the drawing.

The first embodiment of the present invention as illustrated in FIG. 1 employs oxygen-burning with recirculation of condensate as process water.

This composite power generation system comprises a gasification unit A including a primary combustor 2 in which a coal fuel supplied is subjected to a high temperature combustion under a reducing condition by supplying compressed oxygen from a turbo compressor 1; a combustion unit B including a secondary combustor 3 in which the product gas from the gasification unit A is subjected to complete combustion with oxygen under injection therein of steam for effecting control of the combustion gas temperature; a gas turbine 4 driven by the combustion gas from the combustion unit B as the working fluid and; disposed in series dowstream of the gas turbine in order, a waste heat steam generator 5, a desulfurizer 6 and a condenser 7 for the turbine exhaust gas.

A pulverous coal fuel is supplied to the primary combustor 2 of the gasification unit A via a coal supply duct 8. On the other hand, oxygen ($O_2$) isolated from air under separation of nitrogen in a cryoseparator 9 is supplied to the primary combustor 2, under compression up to the scheduled pressure by a turbo compressor 1 (which is driven in this embodiment by the gas turbine 4) via an oxygen gas holder 10, a suction duct 11 and heat exchanger 13 for cooling the product gas of the gasification unit to a temperature permissible for the operation of a dust remover 14 operative to remove remaining dust particles entrained in the product gas.

The product gas from the primary combustor thus adjusted to a requisite temperature and separated from dust particles in the dust remover 14 is supplied to the secondary combustor 3 of the combustion unit B.

A part of the oxygen stream which has been heated in the heat exchanger pipe 15 is supplied to the primary combuster 2 in such an amount that the lowest minimum requisite amount of oxygen for burning the coal fuel is supplied thereto. The remainder of the oxygen stream is passed to the secondary combustor 3 of the combustion unit B via an oxygen supply duct 16. The product gas of the primary combustor 2 is subjected to complete burning in the secondary combustor 3 by the heated oxygen supplied from the oxygen supply duct 16, whereby a high temperature combustion gas is produced. The temperature of this combustion gas is adjusted by injecting an adequate amount of steam supplied from a waste heat steam generator 5 via a steam main 17 so as to maintain the gas inlet temperature of the gas turbine at a scheduled value.

The gas turbine 4 is driven by the resulting temperature-adjusted combustion gas to generate electric power in a steady state.

The exhaust gas from the gas turbine 4 is sent to the waste heat steam generator 5 via an exhaust duct 18 to effect a heat recovery there, whereupon the exhaust gas is passed to the desulfurizer 6 via a duct 19. Then, the desulfurized exhaust gas enters the condenser 7 for the gas turbine exhaust via a duct 20, where a predominant proportion of the steam content is separated upon condensation by cooling as condensate, a part of which is utilized under recirculation in the system.

The gas phase from the condenser 7 consists essentially of $CO_2$ having some moisture content. In this manner, separation of $CO_2$ can easily be attained without requiring any supply of external power with simultaneous recovery of water as condensate.

A part of condensate thus recovered is used for controlling the combustion gas temperature by injecting it to the combustion unit. Thus, a particular amount of the condensate to be used for maintaining the gas turbine inlet temperature at a scheduled value is taken out and injected into the secondary combustor 3 of the combustion unit B under pressurization by a feed pump 21 and after passing through a water treatment unit 22, a water supply line 23 and heat exchange pipe 24 in the heat exchanger 5. The condensate is heated upon passing through the heat exchanger pipe 24 and is converted into steam, which is supplied via the steam main 17 to the secondary combustor 3.

Thus, there is no need for supplementing water from an external source in this embodiment.

Figure 2:
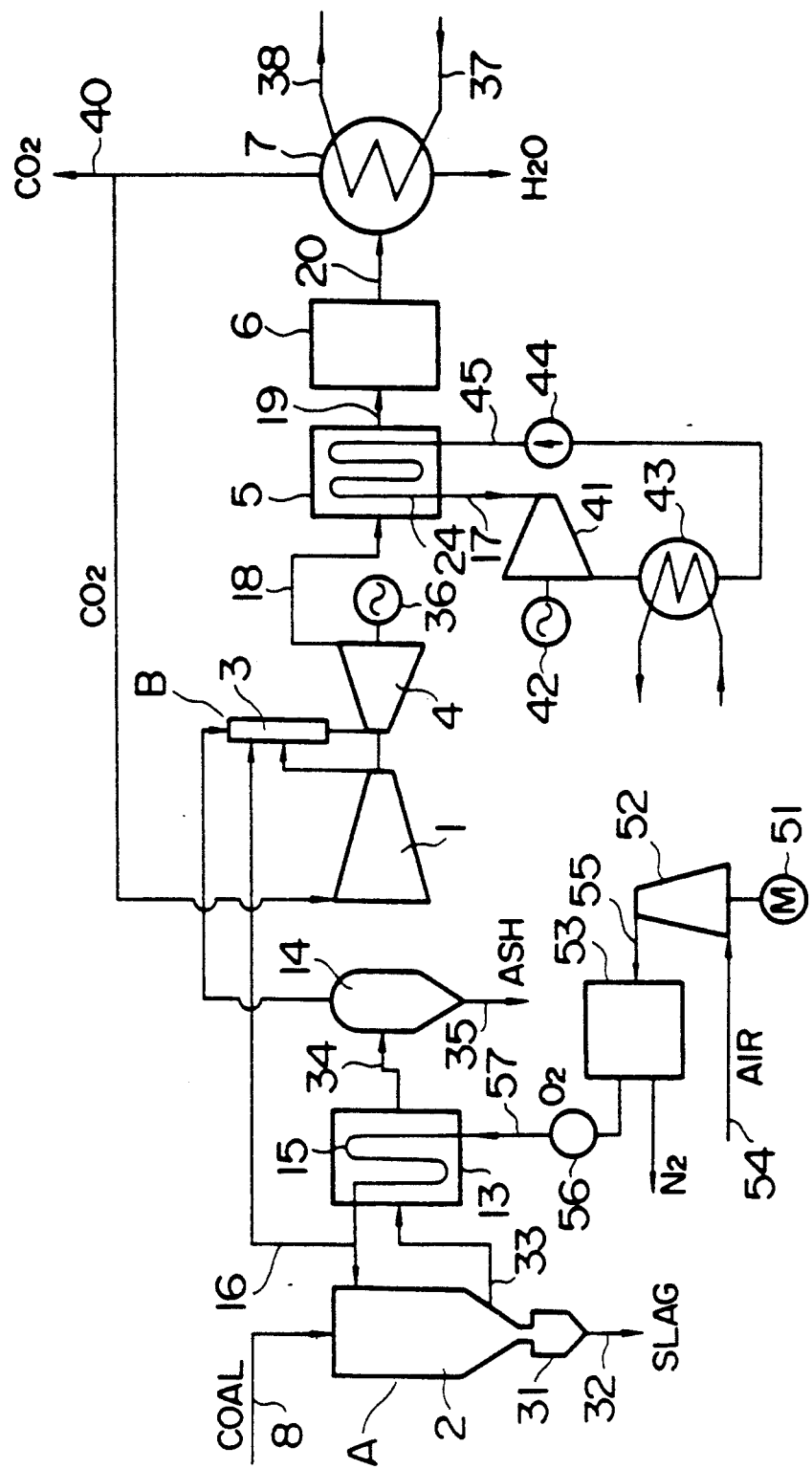
FIG. 2 is a schematic flow diagram showing an embodiment of the coal gasification composite power generation system employing oxygen-burning with $CO_2$ recirculation according to the present invention.

In the embodiment shown in FIG. 1, other numerals denote:

31: A slag tank
32: A slag discharge duct
33: Exhaust duct for the product gas of the primary combustor
34: Dust remover inlet duct
35: Dust remover discharge duct
36: Generator
37: Cooling water inlet conduit
38: Cooling water outlet conduit
39: Condensate extraction line
40: $CO_2$ discharge line The second embodiment of the composite power generation system according to the present invention is shown in FIG. 2, in which oxygen-burning and $CO_2$ recirculation are employed. The same or similar parts of the system as in FIG. 1 are represented by the same part numbers and the explanation therefor is omitted.

In this embodiment, $CO_2$ is separated in the condenser 7 for the gas turbine exhaust and is recirculated in the system under compression by the turbo compressor 1 driven by the gas turbine. It is returned to the secondary combustor 3 for adjusting and maintaining temperature of the exhaust gas thereof to a scheduled value.

The steam generated in the waste heat steam generator 5 is supplied to a steam turbine 41 via the steam main 17 to drive a generator 42. The exhaust from the steam turbine is condensed in a condenser 43 into condensate which is recirculated in the system by returning to the waste heat steam generator 5 by a feed pump 44 under pressurization via a supply line 45.

Oxygen to be supplied to the primary and secondary combustors 2 and 3 is separated from compressed air at a predetermined pressure supplied from an air compressor 52 driven by an electric motor 51 with the use of a cryoseparator 53 for separating the oxygen and nitrogen components.

Figure 3:
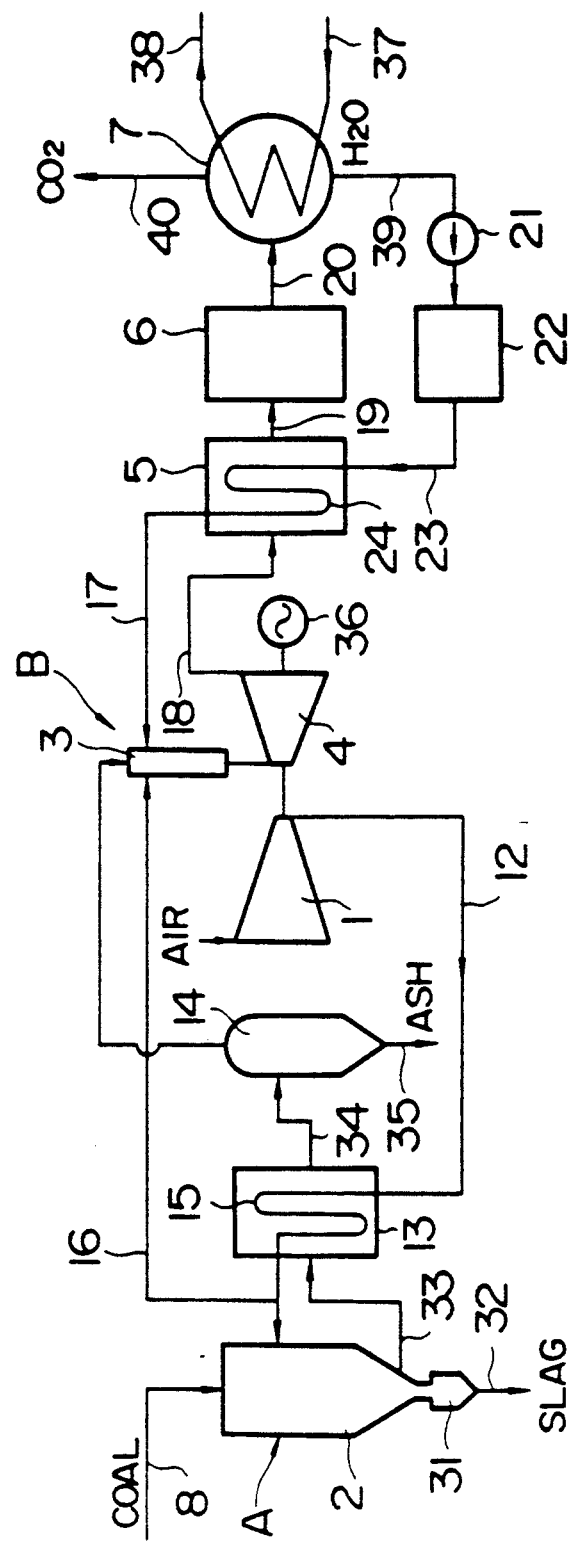
FIG. 3 is a schematic flow diagram showing an embodiment of the coal gasification composite power generation system employing air-burning with water recirculation according to the present invention.

Other numerals in FIG. 2 denote:
54: Air intake duct
55: Air exhaust duct
56: Oxygen manifold
57: Oxygen supply line The third embodiment of the composite power generation system according to the present invention is shown in FIG. 3 in a schematic flow diagram, in which air-burning and water recirculation are incorporated. The same or similar parts of the system as in FIG. 1 are represented by the same part numbers and the explanation therefor is omitted.

In this embodiment, oxygen employed in the first embodiment shown in FIG. 1 is replaced by air. Installation of an air cryoseparator is thus dispensed with. The gas turbine exhaust gas here consists of $N_2$, $CO_2$ and steam, so that the gas to be recirculated for controlling the temperature of combustion gas in the combustion unit consists essentially of $CO_2$ and $N_2$ separated from the condensed steam.

Figure 4:
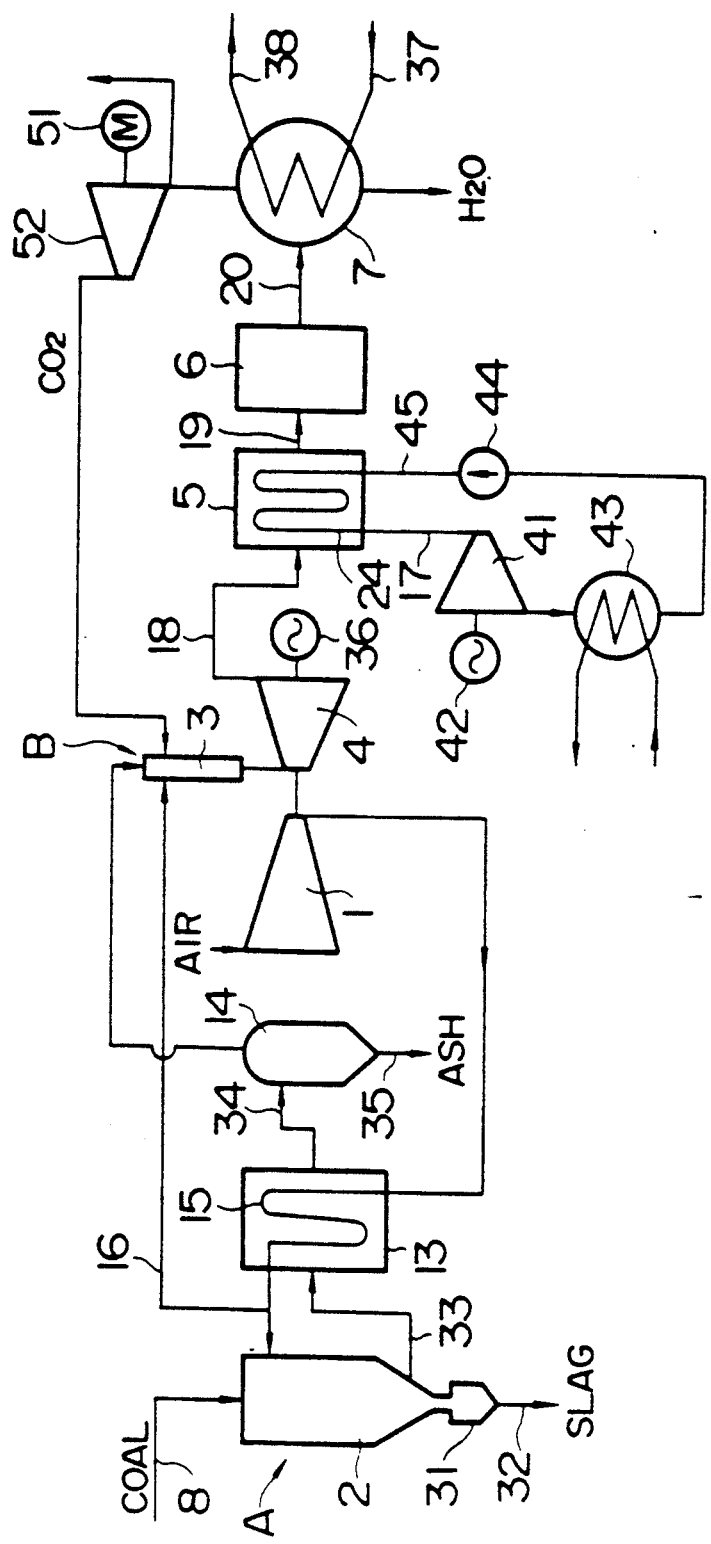
FIG. 4 is a schematic flow diagram showing an embodiment of the coal gasification composite power generation system employing air-burning with $CO_2$ recirculation according to the present invention.

The fourth embodiment of the composite power generation system according to the present invention is shown in FIG. 4 in a schematic flow diagram, in which air-burning and $CO_2$ recirculation are incorporated. The same or similar parts of the system as in FIG. 1 or 2 are represented by the same part numbers and the explanation therefor is omitted.

This embodiment corresponds to a system, in which oxygen employed in the second embodiment shown in FIG. 2 is replaced by air. Here, $CO_2$ is returned to the secondary combustor 3 under compression using an air compressor 52 driven by an electric motor 51.

The fifth embodiment of the composite power generation system according to the present invention is shown in FIG. 5 in a schematic flow diagram, in which oxygen-burning and $H_2O$ recirculation are incorporated. The same or similar parts of the system as in FIG. 1 are represented by the same parts numbers and the explanation therefor is omitted.

In this embodiment, the steam generated in the waste heat steam generator 5 is employed for the cooling medium of the heat exchanger 13 of the product gas of the primary combustor in the first embodiment shown in FIG. 1. The oxygen from the turbo compressor 1 is supplied directly to the primary combustor 2 and to the secondary combustor 3 and the steam generated in the waste heat steam generator 5 is introduced into the secondary combustor 3 through a heat exchanger 13 for the product gas of the primary combustor.

Figure 6:
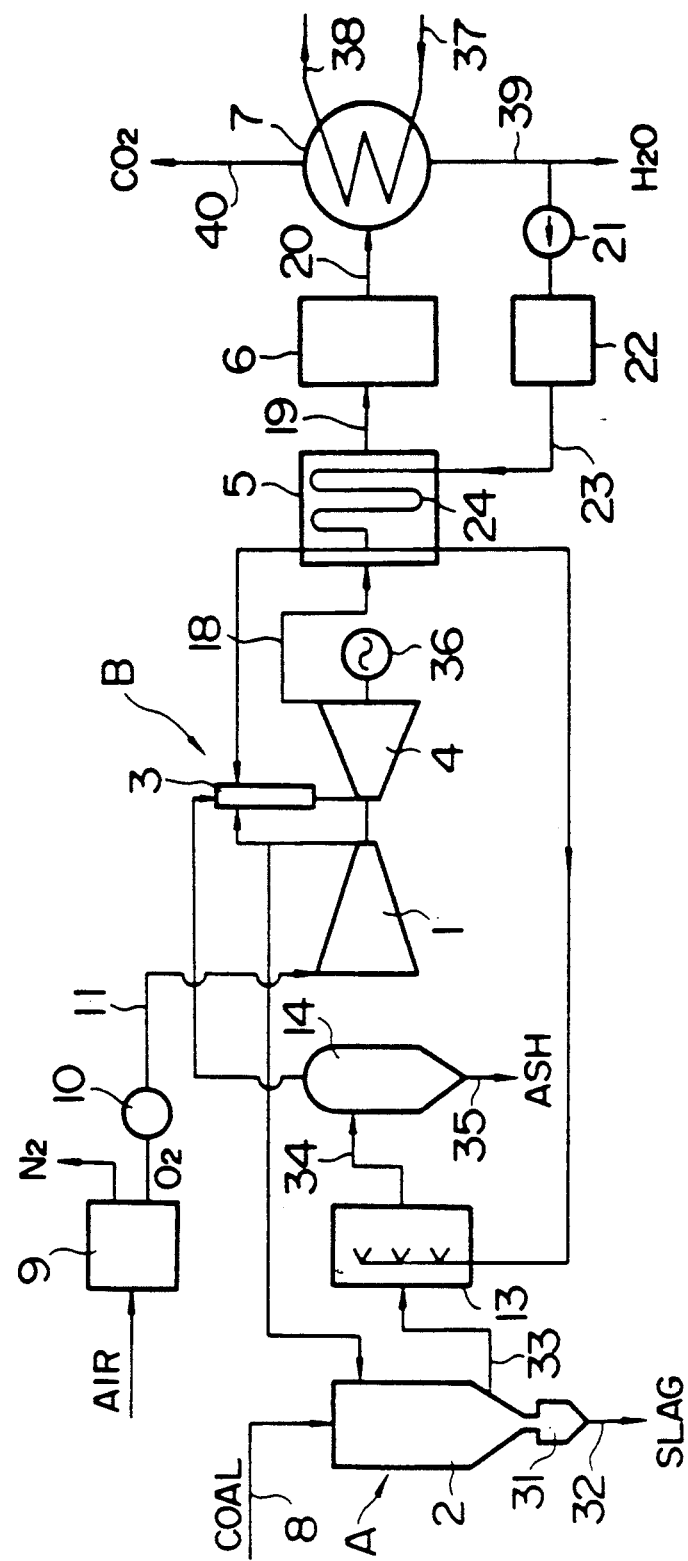
FIG. 6 is a schematic flow diagram showing a further embodiment of the coal gasification composite power generation system employing oxygen-burning with water recirculation according to present invention.
Figure 7:
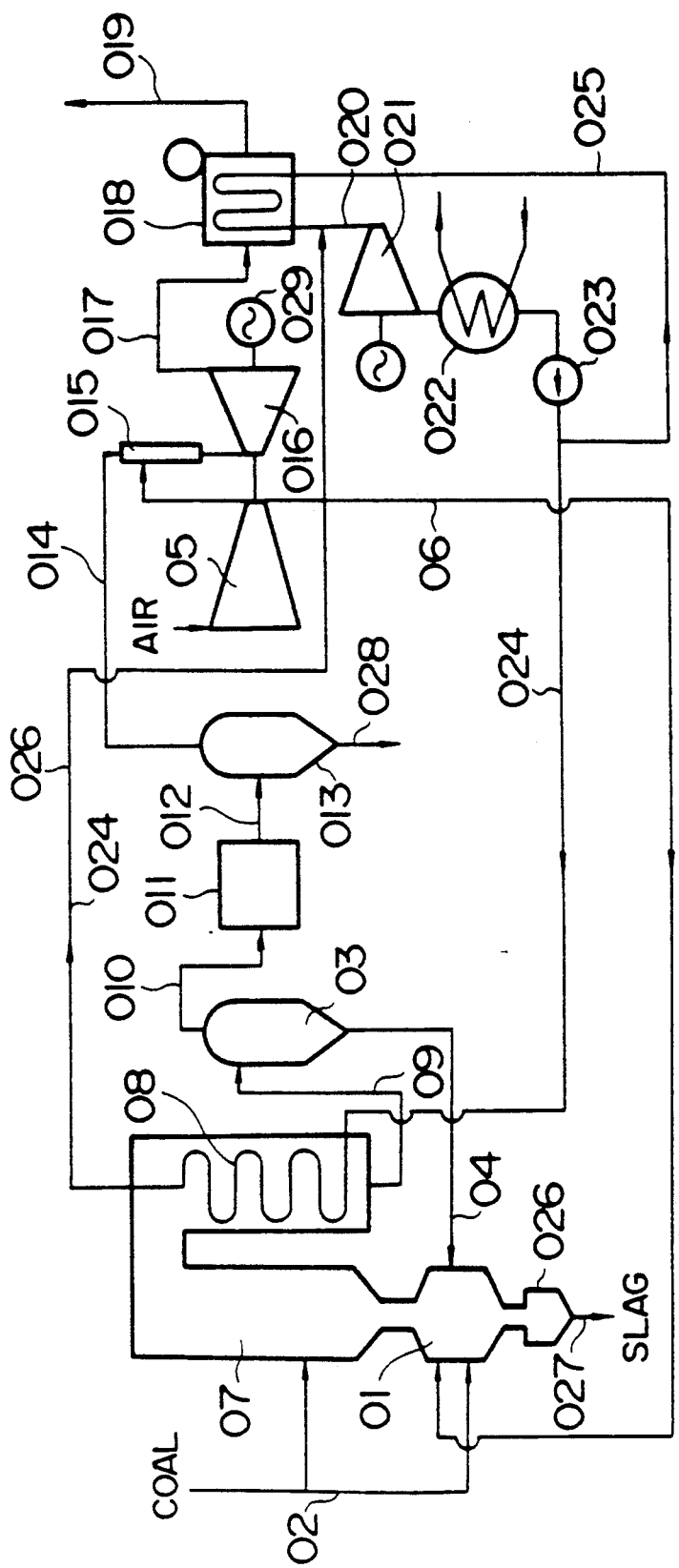
FIG. 7 is a schematic flow diagram of a typical embodiment of a prior art coal gasification composite power generation system of prior.

The sixth embodiment of the composite power generation system according to the present invention is shown in FIG. 6 in a schematic flow diagram, in which oxygen-burning and $H_2O$ recirculation are incorporated. The same or similar parts of the system as in FIG. 1 are represented by the same part numbers and the explanation therefor is omitted.

In this embodiment, a part of the steam generated in the waste heat steam generator 5 is employed for controlling the temperature of the product gas of the primary combustor by spraying it within the product gas heat exchanger 13. The remainder of the steam is injected into the secondary combustor 3 for controlling the inlet temperature of the gas turbine.

Finally, it is to be noted, that employment of air in the place of oxygen in the embodiment shown in FIG. 5 brings forth a further alternative of the composite power generation system in which air-burning and water recirculation are employed. When air is employed instead of oxygen in the embodiment shown in FIG. 6, another alternative of the composite power generation system is provided in which air-burning and water recirculation is employed, with steam spray cooling of the primary combustor product gas.

I claim:

1. A power generation system comprising:

primary combustor means for high temperature combustion of coal fuel under a reducing condition and producing product gas;

means for supplying coal fuel to said primary combustor means;

compressor means having an outlet for supplying a fluid selected from the group consisting of air and oxygen to produce a reducing condition in said primary combustor means;

secondary combustor means for producing complete combustion of said product gas from said primary combustor means;

first duct means for conducting said product gas from said primary combustor means to said secondary combustor means;

second duct means connected between said compressor means outlet and said primary and secondary combustor means for conducting said fluid from said outlet of said compressor means to said primary combustor means and said secondary combustor means;

heat exchanger means in said first and second duct means so that said product gas from said primary combustor means heats said fluid in said second duct means passing from said outlet of said compressor means to said primary and secondary combustor means;

gas turbine means operatively connected to said compressor means for driving said compressor means;

third duct means connected between an outlet of said secondary combustor means and an inlet of said gas turbine means for conducting combustion gas from said secondary combustor means to said gas turbine means;

waste heat steam generator means having an inlet connected to an outlet of said gas turbine means and an outlet;

desulfurization means having an inlet connected to said outlet of said waste heat steam generator means and an outlet;

condenser means having an inlet connected to said outlet of said desulfurization means for receiving said combustion gas from said desulfurization means and for separating carbon dioxide and condensed water therein; and further duct means for conducting an additive fluid from said condenser means to said secondary combustor means for controlling the temperature of said combustion gas from said secondary combustor means, said additive fluid from said condenser means being selected from the group consisting of carbon dioxide and water.

2. A power generation system as claimed in claim 1 wherein:

said further duct means has a first end connected to a condensate outlet of said condenser means, passes through said waste heat steam generator means in heat exchange relationship with said combustion gas and has a second end connected to said secondary combustor means so that said additive fluid comprises condensed water from said condenser means converted to steam in said waste heat steam generator means for serving as said additive fluid.

3. A power generation system as claimed in claim 2, and further comprising:
a dust removal means in said first duct means for removing dust from said product gas between said primary combustor means and said secondary combustor means.

4. A power generation system as claimed in claim 3 wherein:
said heat exchanger means is positioned in said first duct means between said primary combustor means and said dust removal means.

5. A power generation system as claimed in claim 1 wherein:
said further duct means has one end connected to an outlet of said condenser means for said carbon dioxide and a second end connected to said secondary combustor means so that said additive fluid comprises carbon dioxide from said condenser means.

6. A power generation system as claimed in claim 5, and further comprising:
a dust removal means in said first duct means for removing dust from said product gas between said primary combustor means and said secondary combustor means.

7. A power generation system as claimed in claim 6 wherein:
said heat exchanger means is positioned in said first duct means between said primary combustor means and said dust removal means.

8. A power generation system as claimed in claim 1, and further comprising:
a dust removal means in said first duct means for removing dust from said product gas between said primary combustor means and said secondary combustor means.

9. A power generation system as claimed in claim 8 wherein:
said heat exchanger means is positioned in said first duct means between said primary combustor means and said dust removal means.

10. The power generation system as claimed in claim 1, wherein:
said further duct means has one end connected to a carbon dioxide outlet of said condenser means and a second end connected to a gas inlet of said compressor means, so that said carbon dioxide from said condenser means is compressed in said compressor means.

11. A power generation system as claimed in claim 10, and further comprising:
a dust removal means in said first duct means for removing dust from said product gas between said primary combustor means and said secondary combustor means.

12. A power generation system as claimed in claim 11 and further comprising:
steam generating conduits in said waste heat steam generator;
auxiliary turbine means operatively connected to said steam generating conduits for driving said auxiliary turbine means;
auxiliary condenser means operatively connected to an outlet of said auxiliary steam turbine means for condensing steam from said auxiliary steam turbine means; and
pump means for pumping said condensate from said auxiliary condenser means to said steam generating conduits in said waste heat steam generator.

* * * * *